United States Patent [19]

Wagener et al.

[11] 4,225,406
[45] Sep. 30, 1980

[54] CATIONIC DEPOSITION OF POLYMERS ONTO A CONDUCTIVE SURFACE

[75] Inventors: Earl H. Wagener; Ritchie A. Wessling; Dale S. Gibbs, all of Midland, Mich.

[73] Assignee: The Dow Chemical Company, Midland, Mich.

[21] Appl. No.: 587,472

[22] Filed: Jun. 16, 1975

Related U.S. Application Data

[63] Continuation of Ser. No. 128,533, Mar. 26, 1971, abandoned, which is a continuation-in-part of Ser. No. 93,916, Nov. 30, 1970, abandoned.

[51] Int. Cl.$^2$ ............................................. C25D 13/06
[52] U.S. Cl. ................................................. 204/181 C
[58] Field of Search ......................................... 204/181

[56] References Cited

U.S. PATENT DOCUMENTS

| | | | |
|---|---|---|---|
| 3,399,128 | 8/1968 | Brewer et al. | 204/181 |
| 3,501,432 | 3/1970 | Wright et al. | 204/181 |
| 3,609,111 | 9/1971 | Kumanotani et al. | 204/181 |
| 3,937,679 | 2/1976 | Bosso et al. | 204/181 |

*Primary Examiner*—Howard S. Williams
*Attorney, Agent, or Firm*—I. A. Murphy

[57] ABSTRACT

A method for electrodeposition of an organic material on an electroconductive surface comprising placing the electroconductive surface to be coated in contact with an aqueous dispersion containing a water-insoluble, essentially electrically non-conductive, film-forming, organic polymer as cation-active particles wherein the cation-activity is provided at least predominantly by sulfonium cations and passing an electric current from an electrode through the latex to the electroconductive surface in such a direction that the electroconductive surface is negatively charged, i.e., becomes a cathode in an electrophoretic cell. By use of alternating current both electrodes become coated with the polymer.

18 Claims, No Drawings

CATIONIC DEPOSITION OF POLYMERS ONTO A CONDUCTIVE SURFACE

CROSS-REFERENCE TO RELATED APPLICATIONS

This application is a continuation of application Ser. No. 128,533, filed Mar. 26, 1971, which is a continuation-in-part of application Ser. No. 93,916, filed Nov. 30, 1970, both now abandoned.

BACKGROUND OF THE INVENTION (1) Field of the Invention

The invention is concerned with electrodeposition of polymers in aqueous dispersion onto conductive surfaces wherein the article which comprises such surfaces is the cathode in an electric current carrying loop.

(2) Description of the Prior Art

The usual procedure for coating of polymers, which are dispersed in aqueous media, onto articles has been carried out by making the article to be coated the anode. Most such anodic depositions employ the carboxyl as the functional group which assists in the transport of the polymer to the electrode. It is generally agreed that during the deposition of the polymer on the electrode surface, hydrogen ions react with the carboxyl anion to form a water-insoluble acid. Hence, the carboxyl groups remain in the polymer thereby providing relatively hydrophilic points of attack for water. In order to maintain the carboxylate anion, the pH of the system must be maintained above 7 and generally is in the range of from 8.0 to 9.5. Additionally, oxidation occurs at the anode. When the anode, i.e., the article to be coated is a metal, metal ions are produced. This production of metal ions not only is destructive to the anode but may cause discoloration and also tends to coagulate the polymer in an aqueous dispersion, thus forming useless sludge. However, at the cathode, reduction occurs rather than oxidation. Hence, when the article to be coated is made the cathode, formation of metal ions cannot occur at that electrode. There previously has been some recognition that a cathodic electrodeposition system would be desirable. However, there are also problems with the known cationic systems. In general, especially with amine and ammonium type surfactants, the method must be carried out at low pH. Corrosion of metals becomes a problem at low pH. The cations, which provide the means of transport in the known cationic electrophoretic systems, remain with the polymer after deposition and continue to be points of moisture sensitivity.

SUMMARY OF THE INVENTION

It is an object of this invention to provide a method for deposition of organic coatings on electroconductive surfaces.

It is a further object to provide a method for cationic electrodeposition of an organic coating on electroconductive articles.

It is a still further object to provide a method for electrodeposition of coatings having a reduced amount of hydrophilic groups in the final coating.

It is yet another object to provide a method for electrodeposition of coatings which is operable over a wide pH range.

An additional object is to provide an electrodeposition process having good current efficiency and excellent throwing power.

These and other objects are attained in the discovery of a method of electrodeposition in an electrophoretic cell comprising electrodes and a coating bath which comprises using as the coating bath an aqueous dispersion of a water-insoluble, essentially electrically non-conductive, film-forming, organic polymer as cation-active particles wherein the cation-activity is provided at least predominantly by a sulfonium cation, using as one of the electrodes an electroconductive surface to be coated and passing an electric current through the aqueous dispersion in such a direction that the electroconductive surface becomes negatively charged and another electrode becomes electrically positive by applying a source of electric potential to said electrodes. Direct or alternating current may be used. Some of the hydrophilic character of the polymer due to the sulfonium groups is destroyed electrolytically during the deposition and at least most of the then remaining sulfonium groups may be destroyed by subsequent heating.

DESCRIPTION OF THE PREFERRED EMBODIMENTS

The practice of the present invention requires an electroconductive surface to be coated, a source of electric current, an electrode to function as an anode and an aqueous dispersion of a water-insoluble, essentially electrically non-conductive, film-forming, organic polymer as cation-active particles in which the cation activity is provided primarily by the action of a sulfonium cation.

A wide variety of aqueous dispersions of water insoluble, essentially electrically non-conductive polymers are suitable for the practice of this invention.

Typically, such aqueous dispersions of the polymers are obtained by emulsion polymerization of one or more monomers. Ethylenically unsaturated monomers which are thus polymerized are represented by, but not restricted to, non-ionic monomers such as the alkenyl aromatic compounds, i.e., the styrene compounds; the derivatives of $\alpha$-methylene monocarboxylic acids such as the acrylic esters, acrylic nitriles and methacrylic esters; derivatives of $\alpha,\beta$-ethylenically unsaturated dicarboxylic acids such as maleic esters; unsaturated alcohol esters; conjugated dienes; unsaturated ketones; unsaturated ethers; and other polymerizable vinylidene compounds such as vinyl chloride and vinylidene fluoride. Specific examples of such ethylenically unsaturated compounds are styrene, $\alpha$-methylstyrene, ar-methylstyrene, ar-ethylstyrene, $\alpha$-ar-dimethylstyrene, ar,ar-dimethylstyrene, ar,ar-diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl $\alpha$-chloroacrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene, and isoprene.

Such non-ionic monomers form water-insoluble homopolymers or water-insoluble copolymers when more than one of the group is used. However, there may be used as copolymerized constituents with the above kinds of monomers other non-ionic monomers which as homopolymers would be water-soluble. The hydrophilic, water-soluble, non-ionic monomers are represented by hydroxyethyl acrylate, hydroxyethyl methacrylate, acrylamide, methacrylamide, N-methylol acrylamide, N-methylol methacrylamide and other modified acrylamides such as diacetone acrylamide, and diacetone methacrylamide.

Such monomers, or the other more hydrophilic monomers described infra, are not used in sufficiently large proportions as to make the copolymer water-soluble or significantly electrically conductive. The proportion of such somewhat hydrophilic, water-soluble, non-ionic monomers which may be copolymerized constituents of the polymers operable in the practice of this invention ordinarily ranges from 0 to about 30 percent or more based on the total weight of the copolymer.

Other more hydrophilic monomers may be used as constituents of the copolymers in smaller proportions, such as, less than about 4 percent by weight. These hydrophilic monomers are represented by the $\alpha,\beta$-ethylenically unsaturated carboxylic acids, especially such acids having from 3 to 5 carbon atoms, for example acrylic acid, methacrylic acid, maleic acid, fumaric acid, and itaconic acid; aminoalcohol esters of those acids, for example, 2-aminoethyl methacrylate hydrochloride, 2-aminoethyl acrylate hydrochloride, 2-aminopropyl acrylate hydrochloride, 2-aminopropyl methacrylate hydrochloride, 3-aminopropyl methacrylate hydrochloride and other amino alcohol esters as described in U.S. Pat. No. 3,108,979; and sulfo esters of the above-described carboxylic acids such as 2-sulfoethyl acrylate, 2-sulfoethyl methacrylate, bis-(2-sulfoethyl) maleate, bis-(2-sulfoethyl) fumarate and other sulfo esters as described in U.S. Pat. No. 3,024,221 and U.S. Pat. No. 3,147,301.

The hydrophilic monomers are used in sufficiently small proportions that they do not interfere substantially with the cationic deposition process.

Such hydrophilic monomers are used as components of the polymers for the contribution of their polar groups to the properties of the resulting film or coating, such as improved adhesion, rather than for their function in the electrodeposition process per se.

The method also advantageously is used with polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example stereospecific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene, and especially those mono-olefins having up to 8 carbon atoms. Especially common types are the various ethylene/propylene copolymers.

Illustrative of still other polymers which are electrodeposited by the present invention are alkyd resins, block and graft copolymers; e.g., styrene/butadiene graft and block copolymers; epoxy resins such as the reaction products of epichlorohydrin and bisphenol-A; and thermosettable vinyl ester resins; e.g., the reaction products of approximately equimolar amounts of a polyepoxide and an unsaturated monocarboxylic acid such as acrylic acid and methacrylic acid.

Methods for preparing the above described polymers are well known and are not a part of this invention.

It is required in the practice of the present invention that the polymers must be in the form of an aqueous dispersion of cation-active particles in which the cation activity is provided primarily by a sulfonium cation. Such sulfonium cations may be attached to the polymer particles in various ways. For illustration, a sulfonium surfactant may be used in the preparation of the polymers by emulsion polymerization whereby the surfactant is adsorbed on the polymer particle. In still another procedure, preformed polymers, obtained for example by mass polymerization, are converted to aqueous dispersions with the aid of sulfonium surfactants such as by dissolving the polymer in a solvent, then thoroughly mixing the solution with water and the sulfonium surfactant and subsequently removing the solvent to obtain a latex composition. Yet another procedure is to prepare a water-in-oil dispersion by adding a sulfonium emulsifier to a preformed polymer, mixing with water, then slowly adding more water to the water-in-oil dispersion with thorough mixing until inversion occurs to form an oil-in-water dispersion. The sulfonium cation also may become a part of the polymer by the copolymerization, with the other monomeric constituents of the polymer, of a monomer containing a sulfonium cation such as vinylbenzyldimethylsulfonium chloride.

Sulfonium surfactants, in common with all surfactants or emulsifiers, have a hydrophobic component and a hydrophilic component. The hydrophilic portion of a sulfonium surfactant is provided by the sulfonium group, i.e.,

The identity of the hydrophobic portion is not critical. The present invention is concerned with the use of aqueous dispersions of polymers which are maintained in dispersion primarily with sulfonium cations in a cationic electrodeposition system. The sulfonium surfactants or emulsifiers are represented by water-soluble salts having the formula

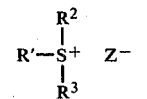

wherein R' is a long chain, monovalent hydrophobic radical having from 8 to 25 carbon atoms, $R^2$ and $R^3$ individually are organic radicals having from 1 to 18 carbon atoms but generally at least one of $R^2$ and $R^3$ has not more than 4 carbon atoms, often both of $R^2$ and $R^3$ have from 1 to 4 carbon atoms, with the proviso that the total number of carbon atoms in R', $R^2$ and $R^3$ ordinarily is not less than about 13 nor greater than about 30 and $Z^-$ is a water soluble counteranion. Any of R', $R^2$ or $R^3$ may be a hydrocarbon radical or the chain length may be interrupted by oxygen, sulfur, nitrogen, phosphorus, or a keto, ester or amide linkage or a terminal group, such as hydroxy, keto, ester and amide, may be present.

In materials for use in the practice of the present invention the counterion $Z^-$ is an electrolytically acceptable anion and is not necessarily water-soluble over the entire pH range, but should be water-soluble over the pH range which is being used in a particular electrodeposition. The counteranion, $Z^-$, is an anion which does not coagulate the dispersion and typically is the anion of an inorganic acid such as chloride, bromide, fluoride, nitrate, sulfate, bicarbonate, and phosphate; or an anion of an organic acid such as acetate, maleate, citrate, propionate, fumarate, acrylate, and benzoate, or hydroxide.

Surfactants of this type are described in U.S. Pat. Nos. 3,102,867, Emmett L. Buhle; 3,322,737, Donald A. Kangas; and 3,409,660, William G. Lloyd, the disclosures of each being incorporated herein by reference.

Those same patents also describe how certain of the latex compositions suitable for the practice of the present invention may be prepared. The sulfonium surfactants may be used in an emulsion polymerization process to prepare the latex products directly, for example as referred to in each of the cited patents. Alternatively, as noted at Col. 5, lines 47-55 of U.S. Pat. No. 3,322,737, a latex can be prepared by emulsion polymerization using other emulsifiers then replacing at least a major proportion of the polymerization emulsifier in such latexes by removal of that emulsifier such as by dialysis or ion exchange methods and then substituting therefor a sulfonium surfactant.

The particle size of the aqueous dispersion or latex, however obtained, is not critical to the electrodeposition process but usually ranges from about 500 Angstroms to about 2500 Angstroms.

The polymer particles have hydrophobic properties because of the nature of the polymer but have some hydrophilic character through positive charges, and hence some cationic character, because of the presence on the particle surface of sulfonium groups such as from adsorbed sulfonium emulsifiers or from copolymerized monomers having sulfonium groups wherein the amount of sulfonium groups attached to the polymer is insufficient to impart water-solubility or electrical conductivity to the dry organic, film-forming polymer. The sulfonium group, i.e., cation, has the formula

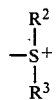

and the counterion is $Z^-$ wherein $R^2$, $R^3$ and $Z^-$ are as identified above for the sulfonium surfactants. In this specification and the accompanying claims the term "cation-active particles" as applied to the polymer particles refers to particles according to the foregoing description.

The process of this invention is used to coat any electroconductive surface, i.e., articles having an electroconductive surface. Examples of materials which furnish electroconductive surfaces are metals such as iron, steel, phosphated steel, copper, aluminum, chromium, magnesium, tin, titanium, nickel, lead, zinc, or a metal alloy consisting of any of the aforesaid metals, conductive gels, conductive polymers and various forms of carbon such as graphite. Such materials can be in various forms or articles such as automobiles, wire, appliances, metal cans, siding, conductive paper and the like.

In the preferred embodiments of this invention a smooth uniform coating is applied to the electroconductive surface.

The aqueous dispersions which are used in the electrocoating process are employed at a polymer concentration of from about 0.5 percent to about 50 percent by weight, preferably from about 5 percent to about 15 percent. The process is operable with aqueous dispersions having a wide range of pH such as from about 2 to about 12, but a pH in the range of from about 5 to about 10 is preferred.

In carrying out the electrodeposition process of this invention, an electrophoretic cell is utilized. In the process, the surface to be coated becomes a cathode, another electrode becomes an anode, the latex composition comprises the coating bath and a source of electric current is required. During the process, the article to be coated can be positioned and maintained so that the surface to be coated is stationary within the coating bath or can be passed through a coating bath in a continuous manner. In the use of direct current, the source is connected to the electrodes so that the current flows in such a direction as to maintain the article to be coated as the cathode and the other electrode as the anode in an electrophoretic system. The anode and the cathode may each be a single member or either or both may constitute a plurality of joined members. In the use of direct current the anode should be inert for this cationic electrodeposition system and can be the tank in which the process is carried out, for example, if the tank is of metal which is graphite-coated on the interior surfaces. If alternating current is used, then the charge on the electrodes alternates between positive and negative and a particular electrode becomes coated during the periods when it is negatively charged. The applied voltage may range from about 10 to about 5000 volts. During the electrodeposition, the voltage is applied in various ways:

(1) constant source voltage which results in decreasing current as the electrodeposition proceeds;
(2) constant current flow which requires increasing voltage as the process occurs;
(3) constant cathode potential, and
(4) pulse, i.e., high voltages for short, intermittent times.

The lower voltages are used with the first three of the above-noted methods, and in those cases preferably ranges from about 40 to about 350 volts. The higher voltages are used with the fourth method of application; such voltages often being in the range of from about 200 to about 800 volts.

At the applied voltages with any of these methods, when the conducting surface of the article to be coated is maintained stationary in the coating bath, the flow of current stops, or becomes very low, when the article is coated.

The coating bath conveniently is operated at ambient temperature, preferably from about 20° C. to about 35° C. although temperatures from about 0° C. to about 70° C. or 80° C. may be used.

To obtain optimum results in the practice of this invention, the concentration and type of water soluble inorganic salts should be controlled. Ordinarily, the concentration of such salts is kept below about 0.1 normal. The salt concentration can affect film thickness, quantity of electricity used, efficiency (milligrams of coating deposited per coulomb), and appearance of the coating. Undesirable reactions apparently occur at the cathode which interfere with the deposition of a smooth film if the cation of the salt has an electrode potential more negative than −2.40 volts as defined at pages 414 and 415, with values being listed from page 415 through page 426, of *The Encyclopedia of Electrochemistry*, Clifford A. Hampel, Editor, Reinhold Publishing Corporation, New York, 1964. Such cations include, for example, sodium, potassium, lithium and calcium ions. At low concentration and/or low voltages, such undesirable reactions are minimized, however.

In the present process, however, a supporting electrolyte assists in some embodiments of the invention to improve efficiency, particularly at low emulsifier concentrations. Such supporting electrolytes are water-soluble and may be used in small amounts such as up to about 0.1 normal based on the total volume of the aqueous dispersion of the coating bath. Ammonium salts of weak acids, such as ammonium acetate, ammonium borate, ammonium carbonate, ammonium bicarbonate, and ammonium maleate, are preferred. Diammonium hydrogen phosphate has been found to be especially effective. In addition to its conductive contribution, that salt also serves to buffer the aqueous medium for those electrodepositions carried out at a pH more basic than 7 and in general to assist in the deposition of smooth films.

The coating bath comprises the aqueous dispersion of polymer including the sulfonium surfactant and various optional additives. Such additives include, for illustration, supporting electrolytes, pH control agents and buffers as referred to above and also such materials as dyes, pigments, fillers, agents for improved flow, and standard plasticizers and/or crosslinking systems for the particular polymer being electrodeposited.

The polymer coating ordinarily is deposited on the electroconductive surface within from about 30 seconds to about 2 minutes, although under the extremes of conditions, the deposition can be accomplished in 20 seconds or less or in some instances deposition is still continuing for 10 minutes or more. During the electrodeposition process, the coating bath should be circulated continuously.

The thickness of the film which is electrodeposited ranges from about 0.1 mil to about 25 mils depending on the conductive substrate, the polymer composition, the soap concentration, the type of inorganic salt, the inorganic salt concentration, the applied voltage, the current density, the pH, the temperature of the coating bath, the deposition time and solids concentration in the coating bath. Usually however, the electrodeposited films have a thickness of between about 0.5 mil and about 5 mils.

The present invention provides an electrodeposition system which has excellent throwing power. By "throwing power" is meant that property whereby areas of the electrode being coated at varying distances from the other electrode receives substantially the same density and thickness of the coating material. Throwing power relates to the ability to coat hidden areas on irregular shaped objects.

The following examples show ways in which the present invention can be practiced, but should not be construed as limiting the invention. All parts are parts by weight and all percentages are weight percentages, unless otherwise expressly indicated.

EXAMPLE 1

Into a rectangular polyethylene electrodeposition cell containing two graphite anodes of equal size located at the ends of the long axis was introduced 70 grams of a latex having a pH of 7.4 and containing 10 percent by weight of a copolymer of 60 percent by weight of butyl acrylate and 40 percent by weight of styrene dispersed as particles having an average diameter of 1090 Angstroms and also containing 0.035 milliequivalents of dodecylbenzyldimethyl sulfonium chloride and 0.02 milliequivalents of diammonium hydrogen phosphate per gram of polymer. A rectangular sample $\frac{1}{2}$ inch by 4 inches by 1/16 inch of phosphated steel (Bonderite 37) was placed in the latex halfway between the two anodes with the flat $\frac{1}{2}$ inch by 4 inch plane normal to a line joining the two anodes. A source of direct current at a potential of 200 volts was connected to the two anodes and the steel sample which functioned as the cathode. The resulting current reached a peak of about 500 milliamperes and then dropped below 20 milliamperes within 10 seconds. The residual current after 2 minutes was 0.7 milliampere. A uniform, smooth film of the copolymer, 0.7 mil in thickness and having a weight of 11.5 milligrams, was deposited on the steel plate. The efficiency was found to be 43.8 milligrams of coating deposited per coulomb.

EXAMPLE 2

A coating was electrodeposited onto steel plate in the same manner as described in Example 1 except that the pH was 7.3 and the starting steel plate was unpolished, cold rolled steel which had been degreased, pickled with hydrochloric acid and washed thoroughly. A smooth, uniform coating of polymer, 0.8 mil in thickness, was deposited on the steel plate with an efficiency of 23.1 milligrams of polymer per coulomb and the residual current after 2 minutes was 1 milliampere.

EXAMPLE 3

A cylindrical container, 2.5 inches in diameter, and 9.5 inches in height was filled with another portion of the latex described in Example 1 except that the amount of diammonium phosphate was 0.15 milliequivalents per gram of polymer. Into the dispersion was placed an iron pipe, $\frac{5}{8}$ inch ID, into which a $\frac{3}{8}$-inch wide strip of the steel described in Example 1 had been inserted previously. A coil of aluminum foil to function as the anode was placed in the dispersion concentric with the iron pipe but not touching the pipe nor the cylindrical container. A source of direct current at a potential of 200 volts was connected to the aluminum anode and to the cathode consisting of the iron pipe with metal strip insert. At the end of one minute the metal strip was removed from the iron pipe end was found to be coated with a smooth, thin layer of polymer. The length of the polymer coating was measured and was found to be 226 millimeters. It was found also that the iron pipe was coated to a height of 226 millimeters; thus the test showed 100 percent throwing power.

EXAMPLES 4–7

Additional pieces of steel were coated by electrodeposition as described in Examples 1 and 2 except the process was carried out with the aqueous dispersion at a different pH and no diammonium hydrogen phosphate was used. The steel plates for Examples 4 and 5 were the same as in Example 1 and for Examples 6 and 7 were the same as in Example 2. The pH values and other data for each of the Examples are shown in Table I.

TABLE I

| Example No. | pH | Coating Weight Mg. | Efficiency Mg. per Coulomb | Film Thickness Mils | Residual Current Ma. |
|---|---|---|---|---|---|
| 4 | 2.6 | 15.3 | 13.6 | 1.0 | 2.5 |
| 5 | 11.2 | 17.1 | 22.7 | 1.2 | 1.5 |
| 6 | 2.6 | 14.2 | 11.3 | 1.0 | 1.5 |
| 7 | 11.2 | 37.3 | 26.5 | 3.4 | 1.6 |

Mg = Milligrams
Ma = Milliamperes

In all these examples, a smooth, uniform coating of polymer was deposited on the steel plate.

EXAMPLE 8

To 50 grams of an epoxy ester made from 40 parts of dehydrated castor oil and 60 parts of an epoxy resin having an epoxyequivalent weight (EEW) of about 900 and which is the reaction product of epichlorohydrin and bisphenol-A was added sufficient xylene to form a solution at 60 percent solids. To the resulting solution was added 5 grams of a 26 percent solution of dodecylbenzyl dimethyl sulfonium chloride. After thorough mixing, 100 grams of distilled water was added slowly and inversion occurred to form an oil-in-water emulsion. That emulsion was diluted with water to a solids content of 10 percent. The resulting emulsion was used to electrodeposit a coating onto the same kind of steel plate by the same procedure as described in Example 1. There was electrodeposited thereby onto the steel plate with good throwing power, a smooth, uniform film having a thickness of 0.8 mil.

EXAMPLE 9

An electrodeposition of polymer was carried out in the same manner and with the same materials as described in Example 8 except that for the xylene solution of epoxy resin there was substituted a vinyl ester resin which had been prepared in the following manner: Two equivalents of methacrylic acid were reacted with one equivalent of a glycidyl polyether of bisphenol-A having an epoxy equivalent weight of 475-575 (DER 661) and one equivalent of a glycidyl polyether of bisphenol-A having an epoxy equivalent weight of 185-192 (DER 331). IMP-30 (tris(di-methylaminomethyl)-phenol) was added as a catalyst and the reactants were heated at about 100° C. until the acid content fell below about 1-2%. The reaction was inhibited against polymerization by the presence of about 110 ppm of hydroquinone. The resulting vinyl ester was then modified by further reaction with about 2.5% of maleic anhydride by heating for about 2 hours at about 100° C. After cooling, the resin was diluted with styrene so that the composition contained about 45% of styrene and 55% of resin. After the electrodeposition the steel plate was found to have a smooth, uniform film deposited thereon.

EXAMPLES 10–27

Additional films were electrodeposited on metal substrates using the same materials and the same process as described in Example 1 except for a difference in pH, concentration of sulfonium emulsifier and of diammonium hydrogen phosphate and for the steel plate there was substituted a different metal as shown in Table II. For examples 10–18, the pH was 3.3, the amount of sulfonium emulsifier was 0.08 milliequivalents per gram of polymer and no diammonium hydrogen phosphate was used. For examples 19–27, the pH was 8.6, the amount of sulfonium emulsifier was 0.05 and the diammonium hydrogen phosphate was 0.04 milliequivalents per gram of polymer.

TABLE II

| | pH 3.3 | | pH 8.6 | |
|---|---|---|---|---|
| Metal Plate | Example No. | Residual Current Ma* | Example No. | Residual Current Ma* |
| Aluminum | 10 | 1.0 | 19 | 0.45 |
| Magnesium | 11 | 1.0 | 20 | 0.6 |
| Platinum | 12 | 0.6 | 21 | 0.55 |
| Lead | 13 | 0.6 | 22 | 0.55 |
| Titanium | 14 | 1.0 | 23 | 0.5 |
| Molybdenum | 15 | 0.7 | 24 | 0.5 |
| Tin | 16 | 1.1 | 25 | 0.6 |
| Silver (a) | 17 | 0.3 | 26 | 0.35 |
| Copper | 18 | 0.75 | 27 | 0.5 |

*Ma = Milliamperes
(a) = wire rather than plate

In each of these examples a smooth, uniform film was deposited on the metal.

EXAMPLES 28–30

Films were electrodeposited on the same kind of steel plate, using the same materials in the same concentrations and the same procedure as described in Example 1 except that the copolymers shown below were substituted for the copolymer of 60 percent butyl acrylate and 40 percent styrene:

Example 28: a copolymer of 50 percent of butyl acrylate and 50 percent of styrene.

Example 29: a copolymer of 50 percent of butadiene and 50 percent of styrene.

Example 30: a copolymer of 80 percent of vinylidene chloride, 15 percent of butyl acrylate and 5 percent of acrylonitrile.

In each of the Examples 28, 29 and 30, a uniform, smooth coating of the polymer was deposited on the steel plate.

EXAMPLE 31

A coating was electrodeposited on phosphated steel by the same method and using the same materials as Example 1 except that the amount of diammonium hydrogen phosphate was 0.04 milliequivalents per gram of polymer and for the latex in that example there was substituted a latex of a copolymer of 67 percent of ethyl acrylate and 33 percent of methyl methacrylate having a pH of 6.7 and a particle size of 1480 Angstroms. In the electrodeposition process it was found that the residual current after two minutes was 0.6 milliamperes and a uniform smooth coating of polymer, 2.2 mils in thickness, and having a weight of 24.4 milligrams was deposited on the steel plate. The efficiency was 35.1 milligrams of coating per coulomb.

EXAMPLE 32

A coating was electrodeposited in the same manner as Example 31 except that for the phosphated steel there was substituted unpolished, cold rolled steel. The results were as follows:
Residual current: 0.5 milliamperes
Coating appearance: Smooth, uniform
Coating weight: 39.1 milligrams Coating thickness: 3.6 mils
Efficiency: 40.1 milligrams per coulomb That which is claimed is:

1. A process for applying a thin, smooth, uniform coating on an object having an electroconductive surface comprising
    (1) immersing the object in a coating bath comprising an aqueous dispersion having a pH in the range from about 2 to about 12 of cation-active particles of water-insoluble, essentially electrically non-conductive, organic, film-forming polymer wherein the cation-activity is provided at least predominantly by sulfonium cations;
    (2) passing an electric current through said bath sufficient to effect deposition of a coating of said polymer on the object by providing a difference of electrical potential between the object and an electrode that is
        (a) spaced apart from said object
        (b) in contact with said bath
        (c) electrically positive in relation to said object, said electric current autogenously stopping or becoming very low when the article is coated.

2. The process of claim 1 in which the electric current is direct current.

3. The process of claim 2 in which the sulfonium cation is provided by dodecylbenzyldimethyl sulfonium chloride.

4. The process of claim 2 in which the aqueous dispersion has a solids content of from about 5 percent to about 15 percent by weight.

5. The process of claim 2 in which the potential is from about 10 to about 5,000 volts.

6. The process of claim 2 in which the potential is from about 40 to about 350 volts.

7. The process of claim 2 in which the potential is applied for short, intermittent times at from about 200 to about 800 volts.

8. The process of claim 2 in which the aqueous dispersion contains a supporting electrolyte in a concentration up to about 0.1 normal.

9. The process of claim 8 in which the supporting electrolyte is diammonium hydrogen phosphate.

10. The process of claim 1 in which the aqueous dispersion is maintained at a pH from about 5 to about 10.

11. The process of claim 1 in which the aqueous dispersion has a pH more basic than 7.

12. The process of claim 1 in which the sulfonium cation is provided by an adsorbed sulfonium surfactant.

13. The process of claim 12 in which the sulfonium surfactant has the formula

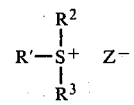

wherein R' is a long chain, monovalent, hydrophobic radical having from 8 to 25 carbon atoms, $R^2$ and $R^3$ individually are organic radicals having from 1 to 18 carbon atoms and $Z^-$ is a water-soluble, electrolytically acceptable anion; with the proviso that the total number of carbon atoms in R', $R^2$ and $R^3$ is from 13 to 30.

14. A process for applying a thin, smooth, uniform coating on an electroconductive article in an electrophoretic cell comprising a coating bath containing an aqueous dispersion of polymer having a pH in the range from about 2 to about 12, an anode, and a cathode having a surface to be coated, said process comprising connecting said anode and said cathode to a source of electromotive potential, applying said potential across said anode and said cathode to pass an electric current through the dispersion and thereby to electrodeposit a coating of polymer on said cathode surface, said aqueous dispersion comprising dispersed cation-active particles of a water-insoluble, essentially electrically nonconductive, film-forming, organic polymer wherein the cation-activity is provided at least predominantly by a sulfonium cation; said electric current autogenously stopping or becoming very low when the article is coated.

15. The process of claim 14 in which the electric current is direct current.

16. The process of claim 12 in which the sulfonium cation has the formula

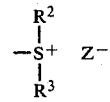

wherein $R^2$ and $R^3$ individually are organic radicals having from 1 to 18 carbon atoms and $Z^-$ is a water-soluble, electrolytically acceptable anion.

17. The process of claim 16 in which the organic radicals $R^2$ and $R^3$ individually have from 1 to 4 carbon atoms.

18. The process of claim 14 in which at least some of the sulfonium cations are provided by a sulfonium surfactant.

* * * * *